(12) United States Patent
Vixie (10) Patent No.: US 10,594,658 B1
(45) Date of Patent: Mar. 17, 2020

(54) PREVENTING A NETWORK PROTOCOL OVER AN ENCRYPTED CHANNEL, AND APPLICATIONS THEREOF

(71) Applicant: FARSIGHT SECURITY, INC., San Mateo, CA (US)

(72) Inventor: Paul Vixie, Redwood City, CA (US)

(73) Assignee: FARSIGHT SECURITY, INC., San Mateo, CA (US)

( * ) Notice: Subject to any disclaimer, the term of this patent is extended or adjusted under 35 U.S.C. 154(b) by 0 days.

(21) Appl. No.: 16/552,874

(22) Filed: Aug. 27, 2019

(51) Int. Cl.
*H04L 29/06* (2006.01)
*H04L 29/12* (2006.01)
*H04L 29/08* (2006.01)

(52) U.S. Cl.
CPC ...... *H04L 63/0263* (2013.01); *H04L 61/1511* (2013.01); *H04L 63/0236* (2013.01); *H04L 63/0272* (2013.01); *H04L 63/0428* (2013.01); *H04L 63/20* (2013.01); *H04L 67/02* (2013.01)

(58) Field of Classification Search
CPC ............... H04L 61/1511; H04L 63/02; H04L 63/0227–0272; H04L 63/1408–1416; H04L 63/1441; H04L 63/1483; H04L 63/20
See application file for complete search history.

(56) References Cited

U.S. PATENT DOCUMENTS

| 2010/0146260 A1* | 6/2010 | Levow | H04L 63/0245 |
| | | | 713/154 |
| 2012/0054860 A1* | 3/2012 | Wyschogrod | H04L 29/12066 |
| | | | 726/22 |
| 2016/0380975 A1* | 12/2016 | Reddy | H04L 63/0281 |
| | | | 726/12 |

* cited by examiner

*Primary Examiner* — Kevin Bechtel
(74) *Attorney, Agent, or Firm* — Sterne, Kessler, Goldstein & Fox P.L.L.C.

(57) ABSTRACT

In an embodiment, a computer-implemented method prevents use of a network protocol over an encrypted channel. In the method, a packet is received on an encrypted channel addressed to a network address. It is determined whether a network host at the network address is able to service a request formatted according to the network protocol over the encrypted channel. When the network host is determined to be able to resolve to a domain name over the encrypted channel, the network packet is blocked.

29 Claims, 7 Drawing Sheets

PREVENTING A NETWORK PROTOCOL OVER AN ENCRYPTED CHANNEL, AND APPLICATIONS THEREOF

FIELD

This field is generally related to network security.

BACKGROUND

Related Art

A communication network allows data to be transferred between two different locations. To transmit data over a network, the data is often divided into pieces, known as packets or blocks. Each packet or block may have a destination network address, such as an internet protocol (IP) address that indicates a destination of the packet and intermediate forwarding devices where the packet should be routed. These addresses are typically numerical, difficult to remember, and may frequently change. Because of this difficulty, these addresses are frequently associated with a "domain name," a readable string that is typically associated with the owner of one of the addresses, such as "www.example.com." When typed into a networking application, such as a web browser, the domain name is translated into an IP address that represents the true form of the destination network address. For example, the Google search engine is associated with a fully qualified domain name (FQDN) "www.google.com.", and when typed into a web browser, this domain name may be translated into a numerical IP address such as "192.168.1.0".

The Domain Name System (DNS) is the system that enables this translation. The DNS stores mappings between domain names and their respective IP addresses, tracks any changes in the mappings where domain names may be remapped to different IP addresses or vice versa, and performs the translation of a domain name to an IP address. The DNS is thus often referred to as a "phone book" for the internet, where domain names and their respective IP addresses are stored. The DNS translates domain names to IP addresses at the behest of a network application such as a web browser, so that a user of the network application can simply remember a domain name rather than a numerical IP address. The DNS may divide the domain space into a hierarchy with different organizations controlling different portions of the hierarchy. In different portions of the hierarchy, different name servers may store resource records that map domain names to network addresses.

To look up a network address from a domain name, the DNS may use resolvers that execute a sequence of queries to different name servers. For example, the sequence of queries to resolve www.example.com may start at the root name server, which indicates the address of the name server for the generic top-level domain name (gTLD) ".com". Then, the DNS resolver may query the name server for the ".com" domain for the address of the name server for example.com. Then, the DNS resolver may query the name server for example.com for the address of www.example.com. In practice, so that a resolver does not need to go through the entire sequence for each request, the resolver may cache the addresses of the various name servers.

The DNS is subject to significant security concerns because of both the age of the DNS and the ingenuity of nefarious parties. In particular, creating a new entry in the DNS is fairly unregulated. A party may register a domain name and its respective IP address through a number of domain name registrar services, which are essentially private businesses that are certified to create new records in the DNS that map IP addresses and new domain names. Many new domain names are registered every day. Some domain names are registered for malicious purposes. The nefarious purposes could include introducing malware into the user's computer system or perpetrating a type of Internet-based confidence scam known as "phishing". A phishing website may provide the appearance of a legitimate company to trick the user into revealing confidential personal information, such as passwords and credit card numbers. These nefarious actions can dilute the brand value of a particular company as their brand name and online presence comes to be thought of as untrustworthy.

For these reasons, a private network operator, such as a company with its own internal network, may wish to block access to certain domain names, preventing requests to those domain names and preventing a lookup to identify the network address associated with those domain names. One example technique to block domain name lookups is to use a DNS response policy zone (DNS RPZ). RPZ allows a DNS recursive resolver to perform particular actions when specified domain names are requested. When a DNS request is made to one of the specified domain names, instead of returning the valid IP address, a DNS resolver may not return any IP address or may return an IP address associated with a webpage indicating that the site is not permitted. Other tools exist for a network administrator to filter domain name requests as well.

DNS may be available over the encrypted channel, such as HTTPS. DNS over HTTPS (DoH) is a protocol for performing remote Domain Name System (DNS) resolution via the HTTPS protocol. One example protocol is in a proposed standard outlined in RFC 8484 available from the Internet Engineering Task Force (IETF). Traditionally, DNS requests occur over Transmission Control Protocol (TCP) port 53 or 853, and occur encrypted only on port 853. DNS over HTTPS instead makes an encrypted HTTPS request, which typically occurs over TCP port 443. DoH may have been motivated by a desire to increase privacy.

Because the message in the HTTPS channel is encrypted, a network administrator's DNS tools might not even recognize that the request is a DNS lookup. As a result, a user may be able to bypass security policies of a network administrator. For example, the user may be able to access blocked, inappropriate sites. Additionally, the user may access malicious sites. In this way, unauthorized actors including malware, intruders, bots, poisoned supply chains, and espionage, whether criminal, industrial, or nation-state in origin, might use DoH to evade monitoring and controls by the operators of private networks they attack. Users may not even do this intentionally, for example in cases where their own devices, accessing a company's private network, have DoH capability.

The difficulty in regulating this traffic over private networks is compounded by a number of other protocols in wide use. Transport Layer Security (TLS) 1.3 is described in RFC 8446. Transport Layer Security generally provides the encryption and privacy for HTTP. An extension to TLS is Server Name Indication (SNI). SNI allows a client to indicate which hostname it is attempting to connect to at the start of the handshaking process. This allows a server to present multiple certificates on the same IP address and TCP port number and hence allows multiple secure (HTTPS) websites (or any other service over TLS) to be served by the same IP address without requiring all those sites to use the same certificate. Traditionally, Server Name Indication (SNI) exposes the hostname the client is connecting to when establishing a TLS connection. However, an encrypted SNI protocol keeps the hostname private when you are visiting an encrypted SNI-enabled site, such as those available, for example, from Cloudflare, Inc. of San Francisco, Calif.

Thus, systems and methods are needed to enforce security policies when network protocols occur over encrypted channels.

BRIEF SUMMARY

In an embodiment, a computer-implemented method prevents use of a network protocol over an encrypted channel. In the method, a packet is received on an encrypted channel addressed to a network address. It is determined whether a network host at the network address is able to service a request formatted according to the network protocol over the encrypted channel. When the network host is determined to be able to resolve to a domain name over the encrypted channel, the network packet is blocked.

In another embodiment, a computer-implemented method prevents domain name service (DNS) over Hypertext Transfer Protocol Secure (HTTPS). In the method, an HTTPS network packet addressed to a network address is received. Whether a network host at the network address is able to resolve a DNS request over HTTPS is determined. When the network host is determined to be able to resolve to the DNS request over HTTPS, the network packet is blocked.

Device and computer program product embodiments are also disclosed.

The drawing in which an element first appears is typically indicated by the leftmost digit or digits in the corresponding reference number. In the drawings, like reference numbers may indicate identical or functionally similar elements.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Embodiments disclosed herein interfere with DoH by detecting web servers who answer the DoH URI pattern (/dns-query) and prohibiting HTTPS network flows outbound toward such web servers. Embodiments allow this to be done automatically, without false positives, and with agility to match the motivations and skills of DoH service operators.

To prohibit HTTPS network flows, an on-path device such as an IP-packet level firewall checks to see whether a host at a packet's destination address can support DoH. The firewall has the ability to keep state about the IP addresses of internal HTTPS clients seeking external HTTPS services and the IP addresses of external HTTPS services. Moreover, the firewall, or another device configured to interact with the firewall, can perform logical analysis of network traffic flows and test external HTTPS servers for DoH capability.

DNS-over-HTTPS (DoH) is not the only protocol which may be considered dangerous by the local network operator. DoH is an example, but Virtual Private Networks (VPN), either commercial or Tor or otherwise, would employ the same basic method.

Figure 1:
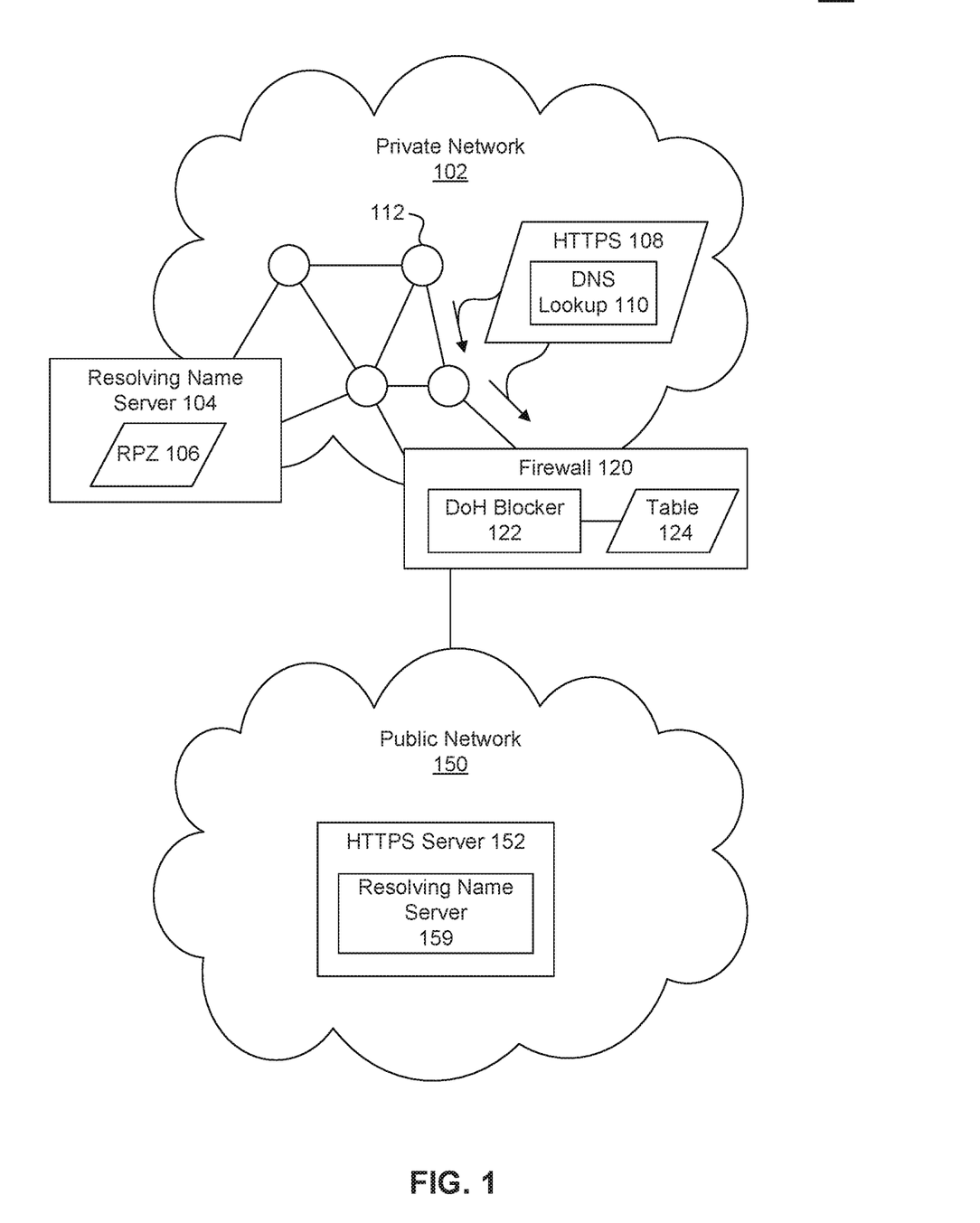
FIG. 1 illustrates a system for blocking DNS over HTTPS, according to an embodiment.

FIG. 1 illustrates a system 100 for blocking DNS over HTTPS, according to an embodiment. System 100 includes a private network 102 and a firewall 120.

Private network 102 is a network where restrictions are established to promote a secure environment. Private network 102 may, for example, be owned or operated by a private entity, such as a company or home network. A network administrator may establish policies for private network 102. Private network 102 may be configured in such a way that devices outside the network cannot access it. Only a selected set of devices can access this type of network depending on the settings encoded in the network routers and access points. Private network 102 may have a private IP address space.

Resolving name server 104 is a server that resolves DNS lookups. Resolving name server 104 may be provided by private network 102 or an Internet Service Provider. Resolving name server 104 may, for example, be one of several configured in the operating systems of nodes, such as node 112, on private network 102. Each node, including node 112, is a computer or other device, such as a printer, connected to private network 102. When any node on private network 102 makes a normal (unencrypted) DNS request, it accesses its configuration information to determine the address of resolving name server 104 and sends a message to resolving name server 104 to look up an address corresponding to a domain name.

Resolving name server 104 has a response policy zone (RPZ) 106. RPZ 106 may specify domain name requests to block. Blocking, as used herein, refers to purposely failing to complete a request by, for example, delivering the requested network address that is a network address corresponding to the hostname. For example, blocking includes merely dropping the request packet and failing to respond at all. Blocking also includes replying to the packet with a non-deliverable message or a message indicating that the node is not allowed to access the site. The message may indicate that the node is forbidden from accessing the site by responding with an IP address to a Web server that, when accessed, turns to a page with that message, thereby informing the user that a network administrator has prevented access to the page. A skilled artisan would recognize that there are other ways, other than RPZ, to block traffic based off a domain name.

Private network 102 is connected to public network 150 via a firewall 120. Firewall 120 is an on-path device that can enforce a policy of a network administrator. As we described below with respect to FIG. 6, private network 102 may have a plurality of firewalls. Together, the various firewalls may provide exclusive access between private network 102 and public network 150.

Public network 150 is a network that is accessible to the public. One example is the Internet, which is a large-scale public network. Another example is a network provided by a telecommunications company serving lots of customers, such as a wide-area Ethernet network.

Public network 150 includes an HTTPS server 152. HTTPS server 152 uses secure socket layer (SSL) or transport layer security (TSL) as a sub-layer under regular HTTP application layering. When an HTTPS server 152 receives a particular Uniform Resource Identifier (URI) pattern (e.g., "/dns-inquiry"), it may route the request to a particular sub-module. In this way, the HTTPS server 152 and resolving name server 159 together can service a DoH request.

Traditionally, when node 112 were to look up a domain name, it would retrieve the IP address of resolving name server 104 from its configuration information and send a DNS request to the IP address. The DNS request may include a header section, a flag section, and/or a question section (which may include a domain name and type of record being resolved). In response, resolving name server 104 would return the answer, e.g., the resource records of the queried names, including their network (e.g., IP) address.

However, using DoH, node 112 would not send a request to resolving name server 104. Instead, node 112 would send an HTTPS request 108 to HTTPS server 152. HTTPS request 108 may expose the destination network address and port of HTTPS server 152. However, the contents of the message, including DNS lookup request 110, would be encrypted. Recognizing that the destination address is located on public network 150, private network 102 would route HTTPS request 108 to firewall 120. Because DNS lookup request 110 is encrypted, firewall 120 may be unable to determine whether the contents of HTTPS request 108 request a prohibited DNS name or whether the contents of HTTPS request 108 are even a DNS lookup at all.

To deal with this problem, firewall 120 includes a DoH Blocker 122 that blocks those requests destined for a network host able to resolve a DoH request. As laid out below with respect to FIGS. 2-4, DoH blocker 122 may look up the destination address in table 124, which stores a list of known servers that service DoH. If the server is known to service DoH requests, DoH blocker 122 may block HTTPS request 108. If table 124 does not indicate whether a destination address of HTTPS request 108 is to be blocked, DoH blocker 122 may test the destination address to determine whether the host at that address can service such requests. Operation of DoH blocker 122 and its various subcomponents are described in greater detail with respect to FIGS. 2-5.

Figure 2:
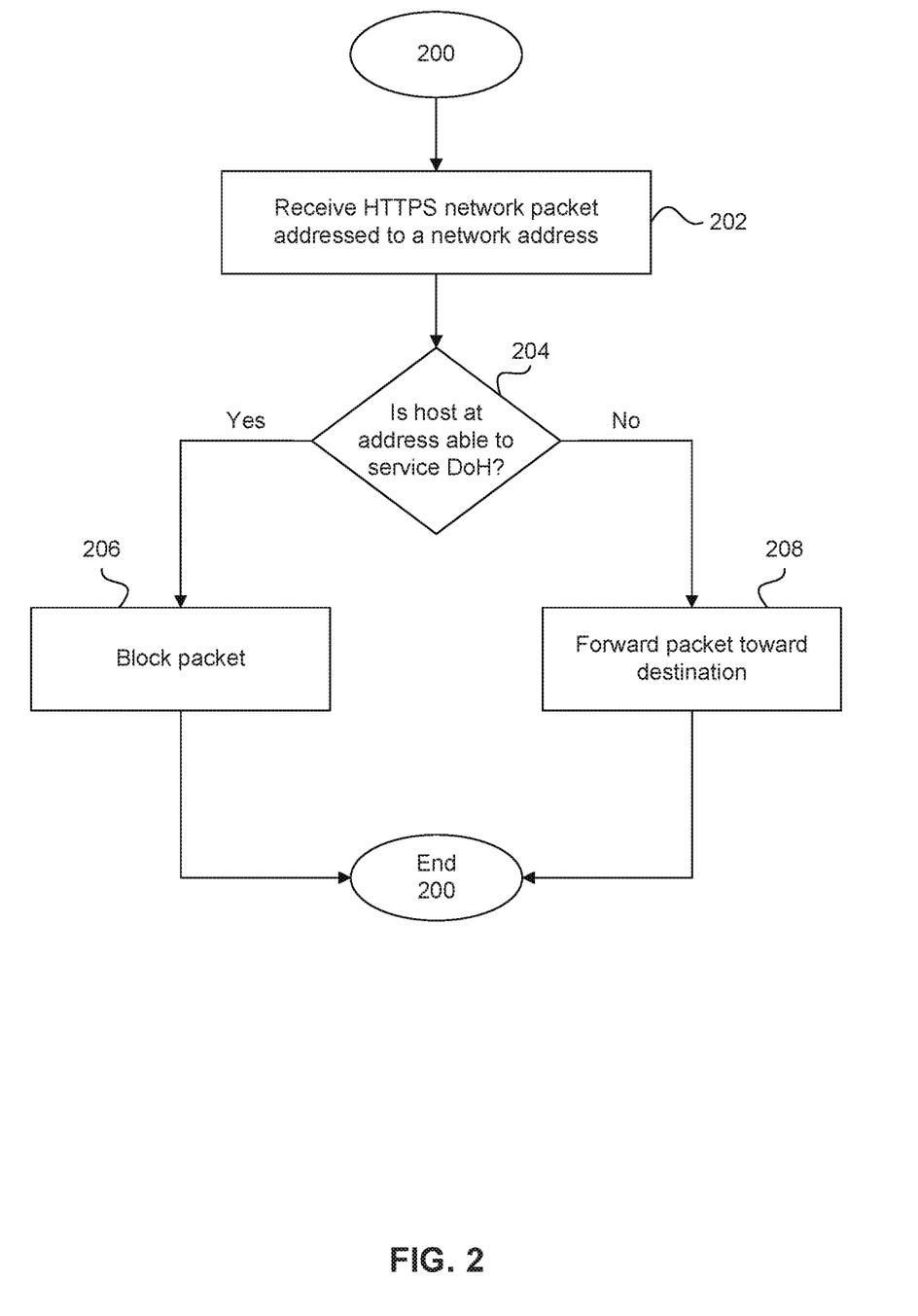
FIG. 2 illustrates a method for blocking DNS over HTTPS, according to an embodiment.

FIG. 2 illustrates a method 200 for blocking DNS over HTTPS, according to an embodiment.

Method 200 starts at step 202 when a DoH blocker receives a network packet. The network packet may be a packet to initiate an encrypted channel, such as HTTPS. It may, for example, be a packet with a destination port 443, the accepted port for HTTPS. The packet would also have a source and destination address. The packet may be a TCP SYN packet. The contents of the network packet may be encrypted.

At step 204, the DoH blocker determines whether a host at the destination address found in the packet is able to service DoH. This operation is described in greater detail with respect to FIGS. 3 and 4. During the time period while the DoH blocker is determining whether a host at the destination address found in the packet is able to service DoH, the network packet may be temporarily held at the firewall, preventing the network packet from reaching the network host.

When the network host is determined to be able to resolve to the DNS request over HTTPS, the DoH blocker intercepts the network packet at step 206. Otherwise, the DOH blocker forwards the packet toward the destination at step 208.

As mentioned above, a skilled artisan would recognize techniques here and would have an application blocking other types of traffic over encrypted channels, such as a VPN or Tor. In those cases, the network packet received in step 202 may be detected based on transport system and port number, or by well-known remote addresses. At step 204, a determination is made whether the network address is able to service such a VPN or Tor request.

Figure 3:
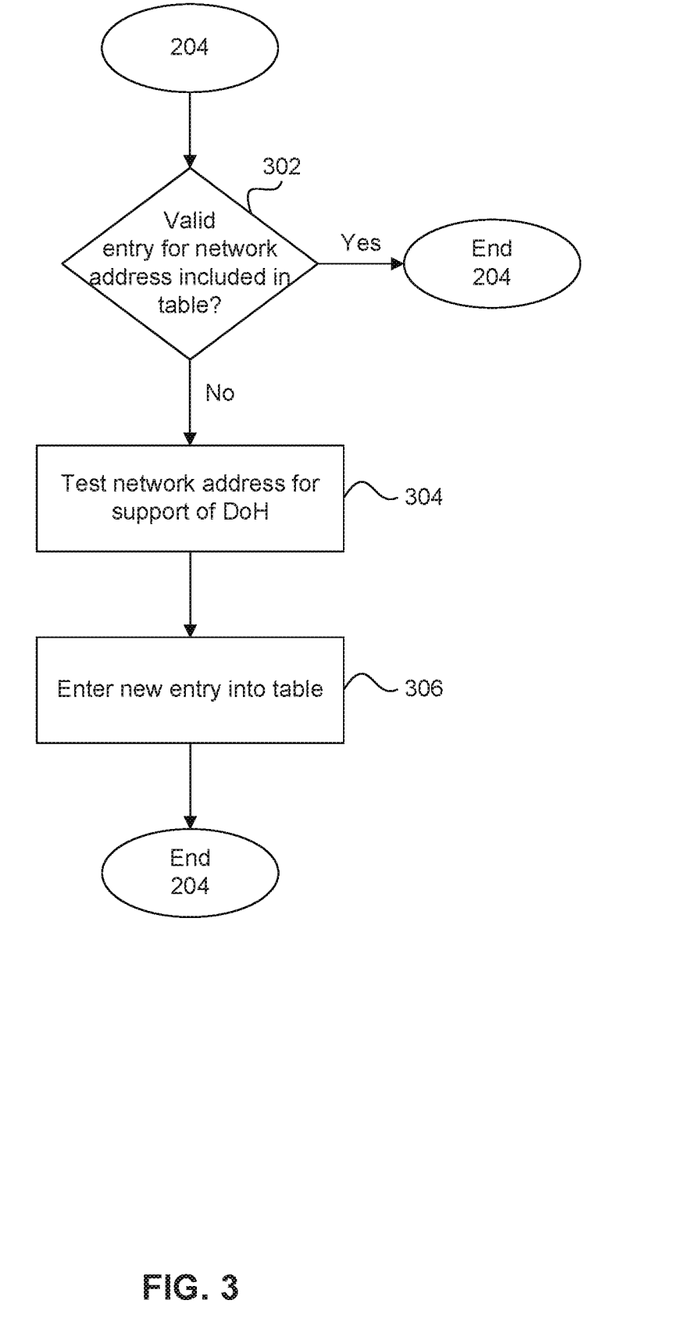
FIG. 3 illustrates a method for determining whether a host is an address able to service DoH, according to an embodiment.

FIG. 3 illustrates an operation 204 for determining whether a host is able to service DoH, according to an embodiment.

Operation 204 starts at a step 302 where DoH blocker determines whether a valid entry for network address is included in a table. An entry may indicate whether a host at a particular network address can support DoH requests. An entry may become invalid after a particular period of time. When a valid entry exists in the table, DOH blocker may rely on the entry in the table, returning the result as the indication in the entry, ending operation 204.

However, when no valid entry exists in the table, the network address is tested at step 304. The test may determine whether the host at the network address supports DoH as described in FIG. 4. The results of the test, along with a corresponding timestamp, are entered as a valid entry in the table at step 306. The timestamp indicates when the entry was created—in other words, when the last test was performed.

In some embodiments, no table is used at all, and a test occurs each time. However, a table may be advantageous in improving performance of the system. In this way, by having a table, TCP packets that do not request DoH and are part of the TCP connection in an "established" state, that is, not being a bare TCP SYN without an ACK, will pass through the IP firewall quickly with a minimum of overhead.

Figure 4:
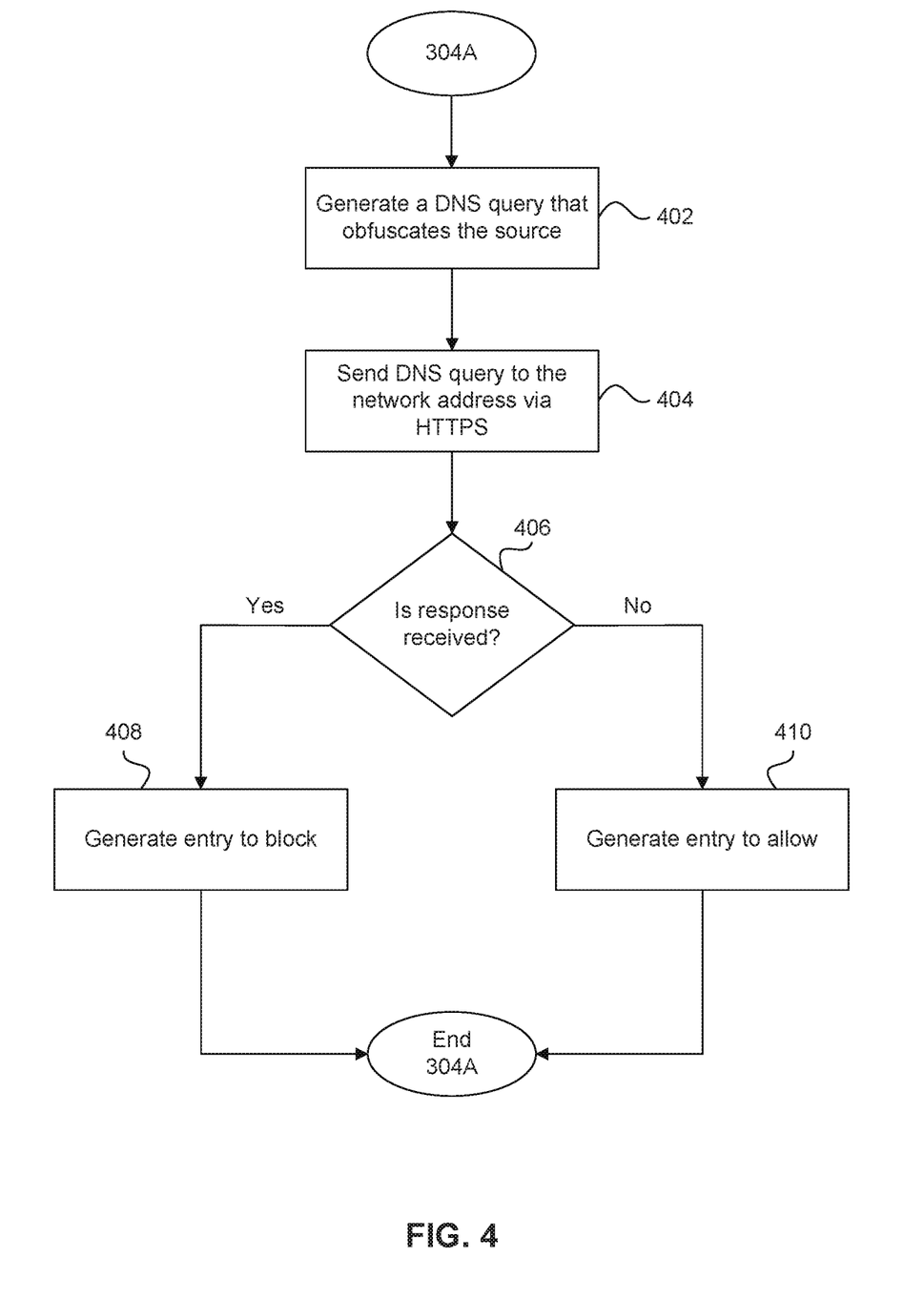
FIG. 4 illustrates a method for testing a network address to determine whether the host of that address is able to service DoH, according to an embodiment.

FIG. 4 illustrates an operation 304A for testing a network address to determine whether the host of that address is able to service DoH, according to an embodiment.

Operation 304A begins at step 402 by generating a DNS query. The DNS query to be performed should be common but unpredictable, perhaps rotating between several names such as www.mozilla.com and www.cloudflare.com and a few others, each time asking for a simple "A" or "AAAA" record set.

At step 404, the DNS query is sent to the network address being tested by an HTTPS. The URI for the HTP as session may be the DoH URI pattern (/dns-query). Sending the DNS query may involve making a new outbound TCP/IP connection to the destination HTTPS server, using the source IP address and source TCP port number of the HTTPS client whose TCP SYN packet was stored above and whose network flow will be diverted by IP firewall rule to the local software performing the DoH test. HTTP persistence may be used to ensure that the DoH testing client will initiate close to prevent TIME_WAIT states on the responding HTTPS server.

At step 406, the DoH blocker determines whether a valid response is received. If the DoH transaction produces a DNS answer having a valid format, then the HTTPS server is considered to support the DoH protocol. At the conclusion of the test, the IP address of the tested HTTPS server is either entered into an IP firewall table exempting it from further interception, as illustrated at step 410, or into an IP firewall table which prohibits all HTTPS network flows from the private network to that HTTPS service IP, as illustrated at step 408. In either case, the table entry shall be tagged with a timestamp indicating when it was created. If the DoH capability was not detected, then the original stored SYN ACK will be released for transmission to the external HTTPS service.

As mentioned above, SNI allows a client setting up a TLS connection to indicate its desired destination host when the same IP address is used to support multiple different hosts, with different security certificates. In this way, a single IP address supported by a company like Akamai Technologies, Inc. of Cambridge, Mass. can serve pages of a variety of websites including, for example, Google or LinkedIn. It is anticipated that an individual seeking to evade security protections may access an HTTPS server supporting DNS that is at the same IP address as other HTTPS services. The server can use the SNI to distinguish between those HTTPS requests seeking a DNS lookup and other types of HTTPS requests of other hosts.

Figure 5:
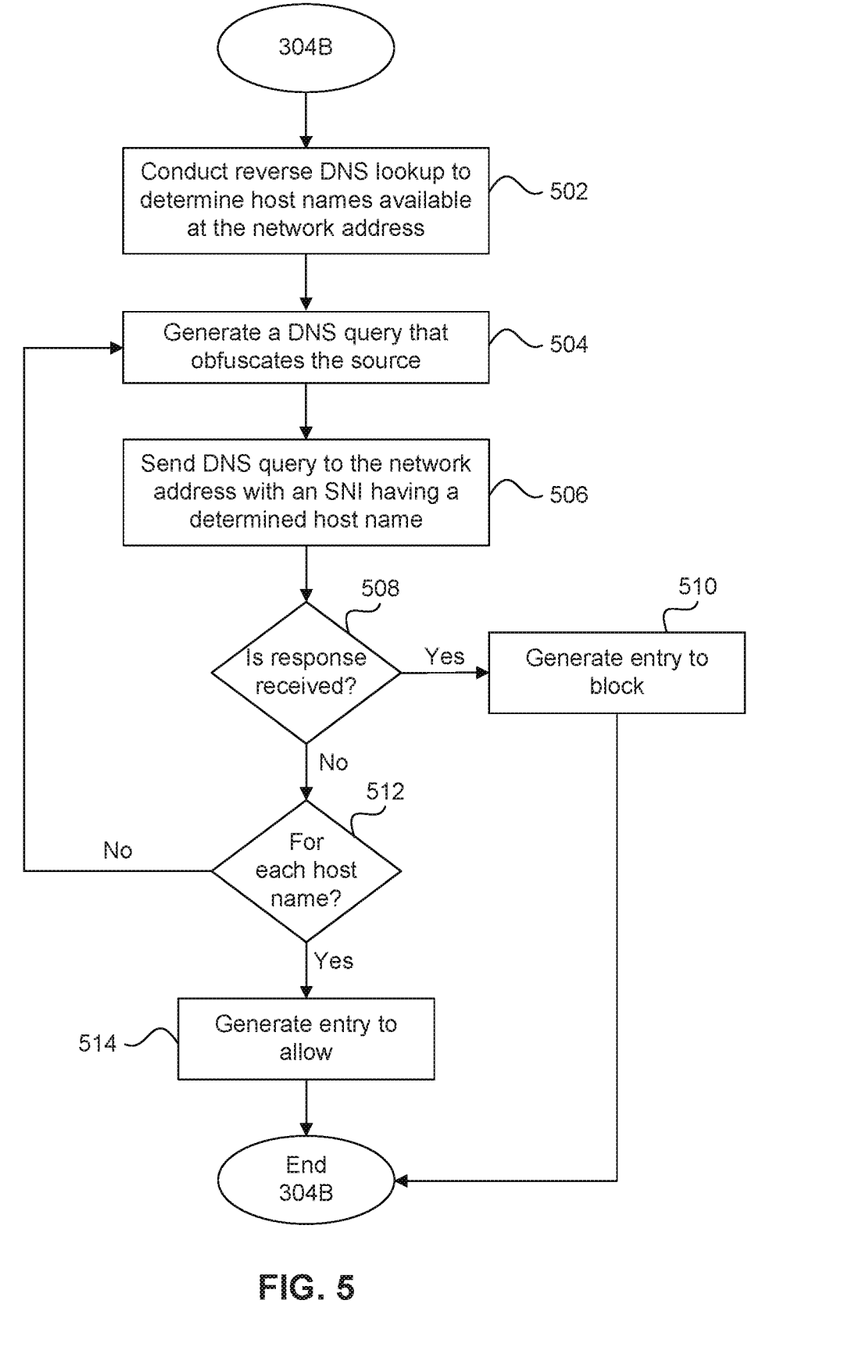
FIG. 5 illustrates another method for testing a network address to determine whether the host of that address is able to service DoH, according to an embodiment.

To prevent this evasion, the testing may involve an operation 304B illustrated in FIG. 5.

Operation 304B begins at step 502 when a DoH blocker conducts a reverse DNS lookup. The reverse DNS lookup determines one or more domain names that map to the network address. This may involve providing a query to the Domain Name System (DNS) (perhaps via resolving name server 104 in FIG. 1) to determine the domain name associated with an IP address. This is the reverse of the usual "forward" DNS lookup of an IP address from a domain name.

At step 504, a DNS query is generated, as described above with respect to step 402 in FIG. 4.

At step 506, a DNS query is sent to the network address via HTTPS as described above with respect to step 404. As described above, the HTTPS session can be initiated using TLS, which can specify an SNI to which to direct the request. An SNI is generated to be directed to one of the host names identified in the reverse DNS lookup in step 502. Again, the DoH URI pattern (/dns-query) may be used. Thus, the URL for these HTTPS requests would be https://[hostname]/dns-query.

At step 508, a check determines whether a response is received, as described above for step 406. If a valid response is received, an entry to block the network address is generated at step 510 (as described above for step 408). As illustrated at step 512, steps 504, 506, and 508 may be repeated for each hostname identified in step 502. If none of them return a valid DoH response, an entry is generated to allow traffic to the network address at step 514.

As described above, operation 304B may have an advantage over operation 304A in preventing a DoH server from hiding within a particular SNI accessible at an IP address. Moreover, operation 304B may encourage companies serving multiple services at a single IP address to refuse to provide DoH services of same IP address. This may allow better regulation of IP traffic to record policies on private networks.

Despite these advantages, operation 304B may require more processing power, time, and network resources over operation 304A. Thus, according to an embodiment, a network administrator may be able to configure whether operation 304A or 304B is used to test a network address. Alternatively or additionally, a network administrator may be able to configure a maximum number of hostnames to test in operation 304B, ensuring that the number of packets sent will be a manageable number.

As described above, the testing shown in operations 304A and B in FIGS. 4 and 5 can occur when a packet that has been received is addressed to a host that does not have a valid entry in a table. Additionally or alternatively, the testing shown in FIG. 4 can occur periodically for a set of network addresses. For example, after an entry is entered into the table, the entry's network address may be retested asynchronously or periodically for a certain period of time. The re-testing interval may not be different for positive vs. negative table entries. Each re-test may be scheduled randomly, at some time between 30 and 600 seconds since the last similar test. This makes the test packets seem genuine to the DoH server.

As mentioned above, a skilled artisan would recognize techniques here and would have an application blocking other types of traffic over encrypted channels, such as a VPN or Tor. In those cases, the only effective way to prohibit DoH is to prohibit unauthorized tunnels.

Figure 6:
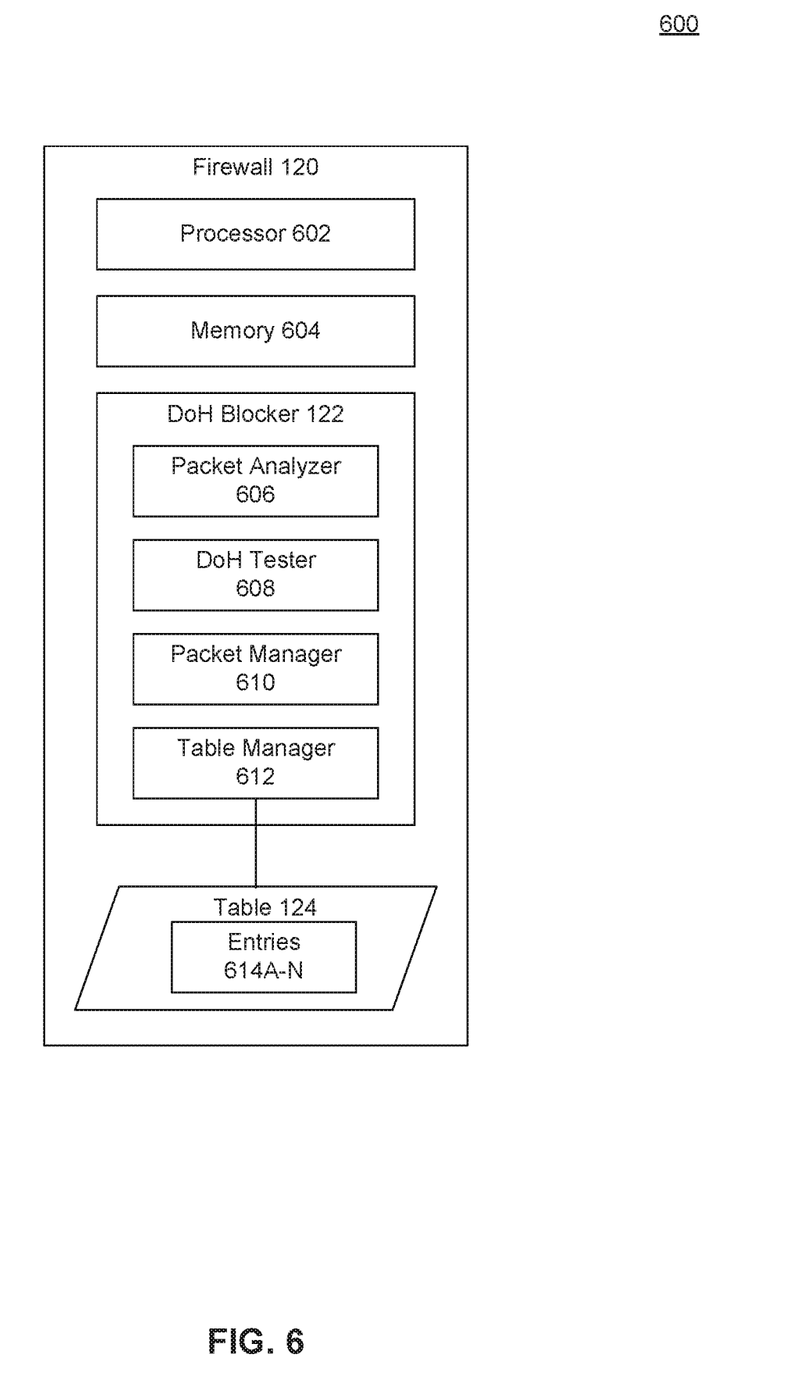
FIG. 6 illustrates a firewall for blocking DNS over HTTPS, according to an embodiment.

FIG. 6 illustrates a system 600, which illustrates firewall 120 for blocking DNS over HTTPS in greater detail. Firewall 120 includes the DoH blocker 122, table 124, processor 602, and memory 604. Each of these components is described below.

DoH blocker 122 includes several sub-modules: packet analyzer 606, DoH tester 608, packet manager 610, and table manager 612. DoH blocker 122, or any of its submodules, may be installed on firewall 120, as shown in FIG. 6. Alternatively, DoH blocker 122, or any of its submodules, may be installed on a computer (not shown) separate from firewall 120 and may interact with firewall 120 using APIs or log files. For example, the DoH blocker 122 may receive log files describing packets received by firewall 120, and it may send messages to firewall 120 instructing firewall 120 to block transmission of packets to particular IP addresses and/or TCP ports. In that embodiment, the DoH blocker 122 may conduct testing asynchronously. Because of delay in the testing process, the firewall may allow the first TCP SYN packet to pass through, before blocking additional packets after a test shows that the destinations are able to service DoH requests.

Packet analyzer 606 receives a network packet configured to initiate or transmit along an encrypted channel. For example, packet analyzer 606 may monitor packets received by firewall 120 and determine whether any are HTTPS network packets. This operation is described, for example, with respect to step 202 in FIG. 2.

DoH tester 608 determines whether a network host at the network address is able to resolve a DNS request over HTTPS. DoH tester 608 may execute the methods shown in step 304 of FIG. 3 and in FIGS. 4 and 5.

Packet manager 610 holds a network packet and prevents it from being forwarded on until DoH blocker 122 determines whether the destination host is able to service DoH. When the network host is determined to be able to resolve to a domain name over HTTPS, packet manager 610 blocks the network packet. Otherwise, packet manager 610 blocks the network packet.

Table manager 612 manages table 124, which has entries 614A-N. For example, table manager 612 may determine whether a valid entry for a network address exists in the table as described above for step 302 in FIG. 3. Table manager 612 may remove those of entries 614A-N that are old, expired, and hence, invalid. Table manager 612 may also periodically or intermittently retest network addresses of entries 614A-N.

Processor 602 may be central processing units, or CPUs. Alternatively, processor 602 may be a specialized hardware device, such as a field programmable gate array or GPU. In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Memory 604 may be a main or primary memory, such as random access memory (RAM). Main memory 604 may include one or more levels of cache. Main memory 604 may have stored therein control logic (i.e., computer software) and/or data.

Figure 7:
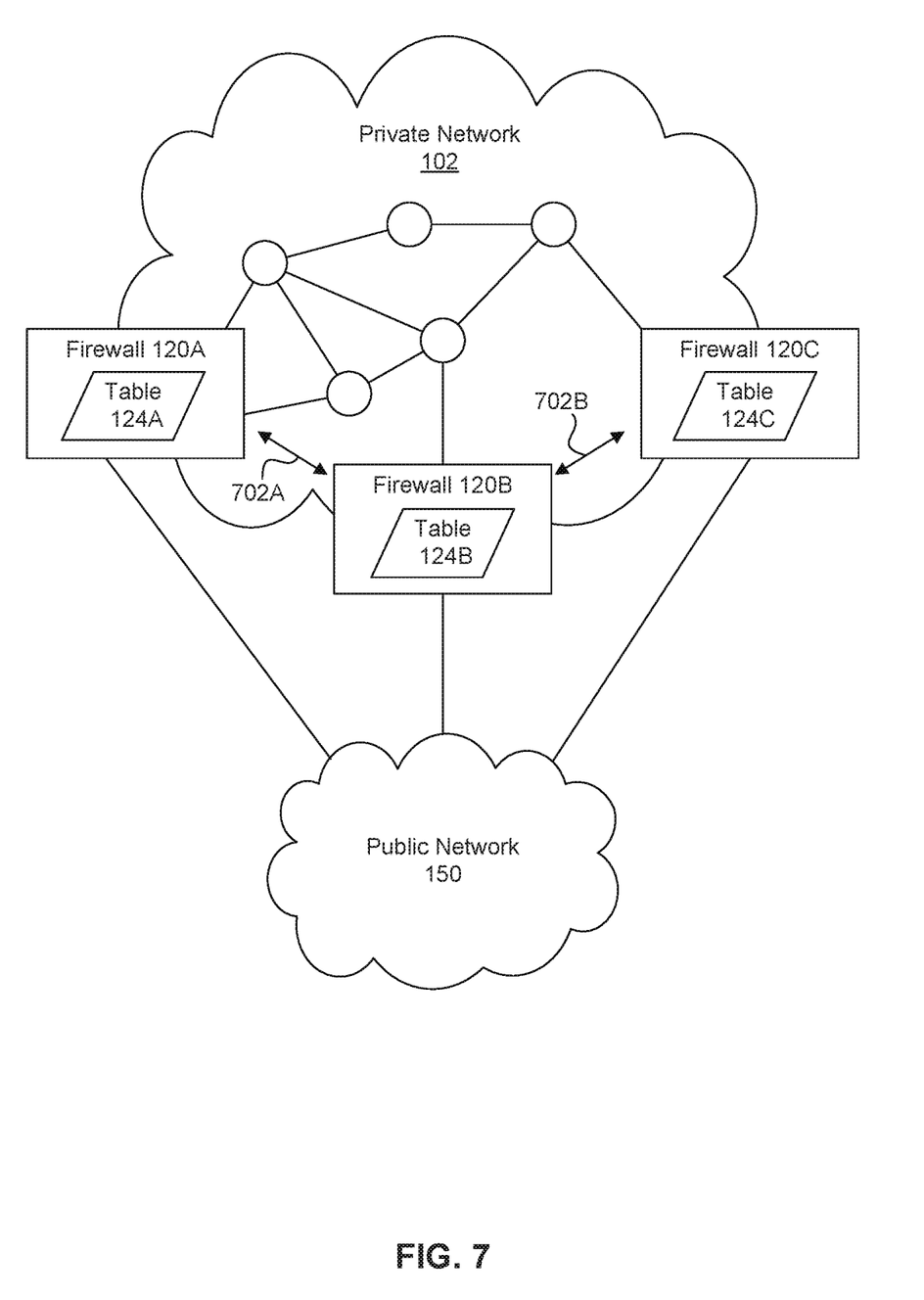
FIG. 7 illustrates a system with multiple firewalls exchanging information to block DNS over HTTPS, according to an embodiment.

FIG. 7 illustrates a system 700 with multiple firewalls 120A-C exchanging information to block DNS over HTTPS, according to an embodiment. Each of firewalls 120A-C provides access from private network 102 to public network 150. Together, they may provide exclusive connection between the two networks and regulate traffic between them. And multiple firewalls 120A-C may be managed by a single administrative energy. Multiple firewalls 120A-C may improved reliability or performance or may make for more logical network topology.

The firewalls 120A-C may exchange messages 702A-B about ways to ensure that their tables 124A-C remain synchronized. In this way, firewalls 120A-C cooperate and share state.

In another embodiment, firewalls 120A-C each may connect a different private network 102 to public network 150. In this embodiment, each of firewalls 120A-C may be managed by different network administrators, yet each may still share information and cooperate by message passing. In this way, firewalls 120A-C may work together to share the results of testing.

The databases, tables, and entries disclosed herein may be any stored type of structured memory, including a persistent memory. In examples, this database may be implemented as a relational database or file system.

Each of the modules in FIGS. 1, 6, and 7 may be implemented in hardware, software, firmware, or any combination thereof implemented on a computing device. A computing device can include, but is not limited to, a device having a processor and memory, including a tangible, non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of, or the entirety of, a clustered or distributed computing environment or server farm. A computing device may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for preventing domain name service (DNS) over Hypertext Transfer Protocol Secure (HTTPS), comprising:
    (a) receiving an HTTPS network packet addressed to a network address;
    (b) determining whether a network host at the network address is able to resolve a DNS request over HTTPS;
    (c) when the network host is determined to be able to resolve the DNS request over HTTPS, blocking the HTTPS network packet; and
    (d) testing to determine whether the network host at the network address supports DNS over HTTPS, wherein the testing comprises:
        (i) sending, via HTTPS, a DNS query to the network address;
        (ii) determining whether an appropriate response is received to the DNS query; and
        (iii) if the appropriate response is received, determining that the network host at the network address resolves a domain name over HTTPS.

2. The method of claim 1, wherein the sending comprises: obfuscating a source of the DNS query.

3. The method of claim 2, wherein the sending is executed by a firewall between a private network and the network host, and wherein the obfuscating comprises:
    generating the DNS query such that the DNS query uses a source address from within the private network, the source address not identifying the firewall.

4. The method of claim 2, wherein the obfuscating comprises:

generating the DNS query such that the DNS query uses the HTTPS network packet's source address and source port number.

5. The method of claim 2, wherein the DNS query requests an IP address for a domain name, the obfuscating comprising:
varying selection of the respective domain name for the DNS query.

6. The method of claim 1, wherein steps (a)-(c) are executed by a network firewall between a private network that originated the HTTPS network packet and the network host.

7. The method of claim 1, wherein the determining (b) occurs in response to receipt of the HTTPS network packet, and wherein the determining comprises:
(i) determining whether a valid entry for the network address exists in a table, the valid entry indicating whether the network host resolves the DNS request over HTTPS;
when the valid entry exists in the table, (ii) checking the entry in the table;
when the valid entry does not exist in the table, (iii) conducting the testing (d) to determine whether the network host at the network address supports DNS over HTTPS;
(iv) entering a result of the test to create the valid entry in the table.

8. The method of claim 7, wherein the determining (b) further comprises (v) while steps (i) and (ii) or (iii) occur, preventing the HTTPS network packet from reaching the network host, and wherein the method further comprises:
(e) when the network host is determined not to resolve to the domain name over HTTPS, forwarding the HTTPS network packet onward toward the network host.

9. The method of claim 7, wherein the valid entry becomes invalid after a particular period of time has transpired.

10. The method of claim 9, wherein the particular period of time is the same regardless of whether the entry indicates that the network host can resolve the DNS request over HTTPS.

11. The method of claim 10, further comprising when the particular period of time has elapsed since a previous test, retesting to determine whether the network host at the network address supports DNS over HTTPS.

12. The method of claim 7, wherein steps (a)-(c) are executed by one of a plurality of network firewalls between a private network that originated the HTTPS network packet and the network host, each of the plurality of network firewalls using a corresponding table to block traffic destined to addresses listed on the corresponding table, the determining (b) further comprising:
(v) sharing the created, valid entry among the plurality of network firewalls to synchronize the corresponding tables.

13. A non-transitory computer-readable device having instructions stored thereon that, when executed by at least one computing device, cause the at least one computing device to perform operations to prevent domain name service (DNS) over Hypertext Transfer Protocol Secure (HTTPS), the operations comprising:
(a) receiving an HTTPS network packet addressed to a network address;
(b) determining whether a network host at the network address is able to resolve a DNS request over HTTPS;
(c) when the network host is determined to be able to resolve to the DNS request over HTTPS, blocking the HTTPS network packet; and
(d) testing to determine whether the network host at the network address supports DNS over HTTPS, wherein the testing comprises:
(i) sending, via HTTPS, a DNS query to the network address;
(ii) determining whether an appropriate response is received to the DNS query; and
(iii) if the appropriate response is received, determining that the network host at the network address resolves a domain name over HTTPS.

14. The non-transitory computer-readable device of claim 13, wherein the sending comprises:
obfuscating a source of the DNS query.

15. The non-transitory computer-readable device of claim 14, wherein the sending is executed by a firewall between a private network and the network host, and wherein the obfuscating comprises:
generating the DNS query such that the DNS query uses a source address from within the private network, the source address not identifying the firewall.

16. The non-transitory computer-readable device of claim 14, wherein the obfuscating comprises:
generating the DNS query such that the DNS query uses the HTTPS network packet's source address and source port number.

17. The non-transitory computer-readable device of claim 14, wherein the DNS query requests an IP address for a domain name, the obfuscating comprising:
varying selection of the domain name for the DNS query.

18. The non-transitory computer-readable device of claim 14, wherein steps (a)-(c) are executed by a network firewall between a private network that originated the HTTPS network packet and the network host.

19. The non-transitory computer-readable device of claim 13, wherein the determining (b) occurs in response to receipt of the HTTPS network packet and wherein the determining (b) comprises:
(i) determining whether a valid entry for the network address exists in a table, the valid entry indicating whether the network host resolves the domain name over HTTPS;
when the valid entry exists in the table, (ii) checking the entry in the table;
when the valid entry does not exist in the table:
(iii) conducting the testing (d) to determine whether the network host at the network address supports DNS over HTTPS;
(iv) entering a result of the test to create the valid entry in the table.

20. The non-transitory computer-readable device of claim 19, wherein the determining (b) further comprises (v) while steps (b).(i) and (b).(ii) or (b).(iii) occur, preventing the HTTPS network packet from reaching the network host, and wherein the method further comprises:
(e) when the network host is determined not to resolve to the domain name over HTTPS, forwarding the HTTPS network packet onward toward the network host.

21. The non-transitory computer-readable device of claim 10, wherein the valid entry becomes invalid after a particular period of time has transpired.

22. The non-transitory computer-readable device of claim 19, wherein steps (a)-(c) are executed by one of a plurality of network firewalls between a private network that originated the HTTPS network packet and the network host, each of the plurality of network firewalls using a corresponding table to block traffic destined to addresses listed on the corresponding table, the determining (b) further comprising:

(v) sharing the created, valid entry among the plurality of network firewalls to synchronize the corresponding tables.

23. A system for preventing domain name service (DNS) over Hypertext Transfer Protocol Secure (HTTPS), comprising:
a non-transitory memory;
a processor, coupled to the memory, the processor configured to execute:
a packet analyzer that receives an HTTPS network packet addressed to a network address;
a DNS over HTTPS (DoH) tester that determines whether a network host at the network address is able to resolve a DNS request over HTTPS, wherein the DoH tester is configured to test to determine whether the network host at the network address supports DNS over HTTPS by (i) sending, via HTTPS, a DNS query to the network address; (ii) determining whether an appropriate response is received to the DNS query; and (iii) if the appropriate response is received, determining that the network host at the network address resolves a domain name over HTTPS; and
a packet manager that, when the network host is determined to be able to resolve to the domain name over HTTPS, blocks the HTTPS network packet.

24. A computer-implemented method for preventing domain name service (DNS) over Hypertext Transfer Protocol Secure (HTTPS), comprising:
(a) receiving an HTTPS network packet addressed to a network address;
(b) determining whether a network host at the network address is able to resolve a DNS request over HTTPS;
(c) when the network host is determined to be able to resolve the DNS request over HTTPS, blocking the HTTPS network packet; and
(d) testing to determine whether the network host at the network address supports DNS over HTTPS, wherein the testing comprises:
(i) conducting a reverse DNS lookup to determine one or more domain names that map to the network address; and
for each of the one or more domain names:
(ii) sending, via HTTPS, a DNS query to look up the respective one or more domain names to the network address;
(iii) determining whether an appropriate response is received to the DNS query; and
(iv) if the appropriate response is received, determining that the network host at the network address resolves the domain name over HTTPS.

25. The method of claim 24, wherein the sending comprises:
obfuscating a source of the DNS query.

26. The method of claim 25, wherein the DNS query requests an IP address for a domain name, the obfuscating comprising:
varying selection of the respective domain name for the DNS query.

27. The method of claim 24, wherein steps (a)-(c) are executed by a network firewall between a private network that originated the HTTPS network packet and the network host.

28. The method of claim 24, wherein the determining (b) occurs in response to receipt of the HTTPS network packet, and wherein the determining (b) comprises:
(i) determining whether a valid entry for the network address exists in a table, the valid entry indicating whether the network host resolves the DNS request over HTTPS;
when the valid entry exists in the table, (ii) checking the entry in the table;
when the valid entry does not exist in the table, (iii) conducting the testing (d) to determine whether the network host at the network address supports DNS over HTTPS;
(iv) entering a result of the test to create the valid entry in the table.

29. The method of claim 7, wherein the determining (b) further comprises (v) while steps (b).(i) and (b).(ii) or (b).(iii) occur, preventing the HTTPS network packet from reaching the network host, and wherein the method further comprises:
(e) when the network host is determined not to resolve to the domain name over HTTPS, forwarding the HTTPS network packet onward toward the network host.

\* \* \* \* \*

UNITED STATES PATENT AND TRADEMARK OFFICE
CERTIFICATE OF CORRECTION

| | |
|---|---|
| PATENT NO. | : 10,594,658 B1 |
| APPLICATION NO. | : 16/552874 |
| DATED | : March 17, 2020 |
| INVENTOR(S) | : Paul Vixie |

It is certified that error appears in the above-identified patent and that said Letters Patent is hereby corrected as shown below:

In the Claims

In Column 12, Lines 61-62, replace "The non-transitory computer-readable device of claim 10" with --The non-transitory computer-readable device of claim 19--.

Signed and Sealed this
Twenty-sixth Day of May, 2020

Andrei Iancu
*Director of the United States Patent and Trademark Office*